United States Patent [19]

Van de Leest

[11] Patent Number: 5,509,958
[45] Date of Patent: Apr. 23, 1996

[54] COATING SOLUTION SUITABLE FOR THE MANUFACTURE OF A MAGNESIUM OXIDE LAYER AND A METHOD OF MANUFACTURING SUCH A LAYER

[75] Inventor: Renaat E. Van de Leest, Eindhoven, Netherlands

[73] Assignee: U.S. Philips Corporation, New York, N.Y.

[21] Appl. No.: 395,743

[22] Filed: Feb. 28, 1995

[30] Foreign Application Priority Data

Feb. 28, 1994 [EP] European Pat. Off. .............. 94200507

[51] Int. Cl.$^6$ .............................. C09D 5/25; C03C 17/28
[52] U.S. Cl. .................. 106/287.26; 423/155; 427/493; 427/508
[58] Field of Search ................ 106/287.26; 723/155; 727/493, 508

[56] References Cited

U.S. PATENT DOCUMENTS 3,087,826   4/1963   Chiloa et al. ................. 106/287.26

FOREIGN PATENT DOCUMENTS

| 0464937 | 1/1992 | European Pat. Off. ......... H01J 31/12 |
| 0533256 | 3/1993 | European Pat. Off. ......... H01J 29/86 |
| 3245874 | 11/1991 | Japan .............................. B05D 1/18 |

*Primary Examiner*—David Brunsman
*Attorney, Agent, or Firm*—Ernestine C. Bartlett

[57] ABSTRACT

A coating solution and a method of manufacturing a magnesium-oxide layer on a glass substrate. The layer obtained is characterized by a satisfactory adhesion and a high secondary electron emission coefficient. The curing temperature can remain below 250° C., so that the method is suitable for the customary types of glass.

Said coating solution comprising a solvent and partially acetylated and partially hydrolyzed $Mg(OR)_2$ of the formula $Mg(OH)_x(OR)_y(OAc)_z$.

9 Claims, No Drawings

COATING SOLUTION SUITABLE FOR THE MANUFACTURE OF A MAGNESIUM OXIDE LAYER AND A METHOD OF MANUFACTURING SUCH A LAYER

The invention relates to a coating solution which can suitably be used to manufacture a magnesium-oxide layer on a glass substrate by curing, said coating solution comprising a solvent and a magnesium compound.

The invention also relates to a method of preparing such a coating solution.

The invention further relates to a method of manufacturing a magnesium-oxide layer on a glass substrate.

Magnesium oxide layers are used, inter alia, as a secondary emission layer for electrons in electron multipliers. Such a layer must have a secondary electron emission coefficient δ of at least 1. Dependent on how it is prepared, magnesium oxide has a δ-value above 1. Magnesium-oxide layers are also used on the glass selection plates and the duct plate of a thin electron display as described in European Patent Application EP-A-464937, filed by Applicants. The magnesium-oxide layer is necessary to generate secondary electrons and to protect the glass plates against electron bombardment. Magnesium oxide is also used as an electrode material in plasma displays to obtain a low ignition voltage.

Magnesium-oxide layers can be manufactured, inter alia, by RF sputtering, e-beam evaporation and Chemical Vapour Deposition (CVD). Vapour-deposited magnesium-oxide layers have a δ-value of 7-10. However, these methods are expensive and less suited for large-scale production of glass plates having large dimensions, such as for flat electron displays. In another known method, the starting material used is a paste comprising MgO particles and an organic binder. The layer is obtained by means of screen printing and firing in air at approximately 500° C. The layer obtained, however, has a low secondary electron emission (δ<5).

Attractive methods of providing oxide layers are those which are obtained in a wet-chemical process, because this does not require the use of expensive equipment.

A method of providing magnesium-oxide layers in a wet-chemical process is indicated in the abstract of Japanese Patent Application JP-A-3/245874. The known method uses a magnesium-hydroxide sol as the starting material which is provided on a porous glass plate. Heating causes the magnesium hydroxide to be converted to magnesium oxide.

A disadvantage of the known method is that said conversion requires a temperature of at least 500° C. This temperature is too high for substrates of most of the known types of glass, such as soda-lime glass and borosilicate glass, because at such a temperature an undesired deformation of the substrates occurs. Said deformation is undesirable because, in the above-mentioned thin electron display high requirements are imposed on the dimensional accuracy and flatness of glass selection plates.

An alternative wet-chemical method of providing magnesium-oxide layers is based on the thermal decomposition of magnesium acetylacetonate in an oxygen-containing atmosphere. In this process, a temperature of at least 600° C. is required, which is unsuitable for glass substrates. In addition, the adhesion of a thus manufactured magnesiumoxide layer on glass is insufficient.

Another alternative wet-chemical method of providing (magnesium-)oxide layers is the sol-gel method, as described, for example, in European Patent Application EP-A-533256, filed by Applicants. The sol-gel method is based on the conversion by hydrolysis and polycondensation of a metal-alkoxy compound in an aqueous solvent. In this way, for example, a silicon-dioxide layer is manufactured on the basis of an aqueous solution of tetraethyl orthosilicate (tetraethoxy silane).

A problem of magnesium-dialkoxide compounds, such as magnesium diethoxide, is, however, that the hydrolysis reaction causes $Mg(OH)_2$ to precipitate. In addition, magnesium-dialkoxide compounds are only slightly soluble in water and alcohols.

It is an object of the invention to provide, inter alia, a coating solution which can suitably be used to manufacture a magnesium-oxide layer on a glass substrate at a temperature of maximally 250° C. The magnesium-oxide layer must adhere well to glass and exhibit a high secondary electron emission (δ>5). The invention also aims at providing a simple method of manufacturing a magnesium-oxide layer on a glass substrate, which method must be practicable, in particular, at relatively low temperatures, i.e. below 250° C. A further object of the invention is to provide a method of manufacturing such a coating solution.

These objects are achieved by a coating solution as described in the opening paragraph, which is characterized according to the invention in that the magnesium compound can be obtained by, in succession, partially acetylating and partially hydrolysing a magnesium-dialkoxide compound of the formula $Mg(OR)_2$, thereby forming the magnesium compound of the formula $Mg(OH)_x(OR)_y(OAc)_z$, wherein R is a $C_1$-$C_5$ alkyl group, and OAc is an acetyl or acetylacetonate group, and wherein $0<c<1$ $0<y<1$ $0<z<1$, and $x+y+z=2$.

The chemically modified magnesium alkoxide in accordance with the above formula is chelated with bidentate acetate ligands or acetylacetonate ligands (OAc). A part of the alkoxy groups (OR) is replaced by hydroxyl groups (OH) by hydrolysis, however, the compound remains soluble in alcohols and alcohol-water mixtures by virtue of the acetate or acetylacetonate ligands. During hydrolysis the acetate or acetylacetonate ligands are not replaced by hydroxyl groups because they have a greater stability.

The presence of hydroxyl groups enables the polycondensation reaction to take place in accordance with the following reaction equation:

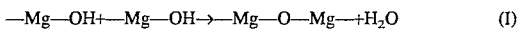

$$—Mg—OH + —Mg—OH \rightarrow —Mg—O—Mg— + H_2O \qquad (I)$$

The hydroxyl groups are also responsible for a good adhesion to the surface of the glass substrate by condensation of OH groups of the glass surface. The presence of the hydroxyl groups also enables the chemical curing process to be accelerated by exposure to shortwave UV light (wavelength<300 nm). Curing so as to form a magnesium-oxide layer can then be carded out at temperatures below 250° C.

By virtue of the presence of the bidentate acetate or acetylacetonate ligands, solutions of said magnesium compounds are stable in air. Preferably, an acetate ligand is used because an acetylacetonate ligand may bring about photopolymerization, followed by swelling during exposure to UV light.

The presence of alkoxide groups is not necessary, yet unavoidable. The reason is, as revealed by infrared analysis, that after hydrolysis of the magnesium-alkoxy compound which is modified with acetyl or acetylacetonate groups, a small part of the alkoxy groups has not been converted to hydroxyl groups.

Said modified magnesium compounds can be prepared by reacting a magnesium dialkoxide with acetic acid or acetylacetone. A suitable magnesium dialkoxide is, for example, magnesium diethoxide which is dissolved in pure (water-free) acetic acid or acetylacetone. Subsequently, water is added and the solution is concentrated by evaporation. The solid substance obtained is a chemically modified magnesium ethoxide which comprises hydroxyl groups and acetate groups or acetylacetonate groups and which can be dissolved in solvents such as alcohols and in alcohol-water mixtures, thereby forming the coating solution in accordance with the invention.

Said modified magnesium compounds can also be prepared by reacting a suspension of a magnesium dialkoxide in an alcohol, such as ethanol or isopropanol, with acetic acid or acetylace tone. An excess of these reagents is required to dissolve the magnesium dialkoxide. Subsequently, water is added to hydrolyse the compound. The solution obtained is ready for use as a coating solution and remains stable for weeks.

In another suitable method of preparing said modified magnesium compounds, a magnesium dialkoxide is dissolved in 2-ethoxy ethanol (ethylene glycol monoethyl ether). Subsequently, acetic acid or acetylacetone is added. After this reaction, water is added to introduce hydroxyl groups into the magnesium compound.

Other suitable magnesium-alkoxide compounds are $C_1$—, $C_3$—, $C_4$— and $C_5$—alkoxide compounds. Higher alkoxide compounds are more difficult to dissolve in acetic acid or acetylacetone.

An alcohol is preferably used as the solvent for the coating solution. Suitable alcohols are, for example, methanol, ethanol and isopropanol. The coating solution may optionally contain a small quantity of water. In order to properly wet the glass substrate surface with the coating solution, the water content generally must not exceed 20 vol %.

The presence of water in the coating solution is not necessary. In the absence of water, the magnesium-oxide layer can be cured by exposure to UV light in the presence of a compound which upon exposure generates hydroxyl radicals, such as nitric acid ($HNO_3$). An effective concentration ranges from 0.01 to 0.2 mol/l. Higher nitric acid concentrations may cause corrosion of the glass and the equipment. The omission of water from the coating solution has the advantage that hydrolysis and hence condensation at room temperature cannot take place, which leads to a longer pot life of the coating solution. In addition, gelation of the coating solution, which can occur if the coating solution is ultrasonically atomized, does not take place. If gelation takes place, the ultrasonic diaphragm must be cleaned regularly.

The object of providing a simple method of manufacturing a magnesium-oxide layer on a glass :substrate is achieved in accordance with the invention by a method which comprises the following steps:

applying a layer of a coating solution in accordance with the invention to the substrate;

exposing the layer to UV light having a wavelength which is shorter than 300 nm in an inert atmosphere and simultaneously heating the layer, thereby forming the magnesium-oxide layer.

The above-mentioned solution in accordance with the invention is used as the coating solution.

A liquid layer of the coating solution can be applied to the substrate in a customary manner, such as by dipping, spinning, spraying, ultrasonically or otherwise, or by means of a laminar coating process in which the liquid layer is provided by means of a roller which rotates partly in the coating solution.

For the exposure to light use can for example be made of a low-pressure mercury vapour lamp which emits light having wavelengths of 185 nm and 254 nm. The condensation reaction which causes a magnesium-oxide network to be formed is accelerated by said exposure to UV light.

For the exposure use can very suitably be made of an excimer lamp, such as a xenon-dimer excimer lamp having a wavelength of 172 nm. Excimer lamps radiate light of a higher intensity than low-pressure mercury vapour lamps, thereby shortening the process time.

Exposure must take place in an inert, i.e. oxygen-free, atmosphere, such as in nitrogen or in a vacuum.

Heating of the layer can take place in every known manner, for example in a furnace, which also comprises UV lamps. Above 100° C. the water disappears from the layer. Said water originates from the polycondensation reaction (I) and possibly from the solvent used. Above 200° C. the acetylacetonate ligands disappear. The acetate ligands disappear at a slightly lower temperature. By simultaneously exposing the layer to shortwave UV light, the layer cart already be cured at temperatures below 250° C. It has been found that the curing temperature can be lower as the wavelength of the UV light used is shorter. A relatively low curing temperature of 250° C. does not affect glass substrates. Without UV exposure, a temperature of 450° C. is required to obtain the same properties of the magnesium-oxide layer. As mentioned hereinabove, this photochemical curing is made possible by the presence of hydroxyl groups in the magnesium compound used. In addition, the hydroxyl groups ensure a good adhesion to the glass surface. The secondary electron emission coefficient δ of the layers obtained in accordance with the invention is 7–8.

Magnesium-oxide particles may optionally be added to the coating solution in accordance with the invention. These magnesium-oxide particles can be prepared beforehand in such a manner that they obtain a maximum secondary electron emission coefficient δ. These particles can for example be prepared by heating $Mg(OH)_2$ to 800° C. The size of the particles is, for example, 50–100 nm. After the particles have been prepared, they are suspended in the coating solution in accordance with the invention. The concentration of the particles is 1–10 wt. %. The liquid layer is provided on a glass substrate and cured in the manner described hereinabove. After curing of the liquid layer, the magnesium-oxide layer formed consists of a matrix of a magnesium-oxide network in which magnesium-oxide particles are embedded. This embedment is responsible for the satisfactory adhesion of the magnesium-oxide particles to the glass surface.

The invention will be explained in greater detail by means of an exemplary embodiment.

Exemplary embodiment.

Preparation of the coating solution.

A quantity of 62 g of magnesium-diethoxide grains (supplier Hüls) are suspended in 850 ml ethanol. Subsequently, 100 ml of 100% acetic acid are added in which the magnesium diethoxide is dissolved completely. Next, 50 ml water is added to hydrolyse the modified magnesium diethoxide. The coating solution obtained contains 0.5 mol/l of the chemically modified magnesium-diethoxide compound of which the majority of the ethoxy groups are replaced by acetyl groups and hydroxyl groups. The solution remains stable for many weeks.

Preparation of magnesium-oxide layer.

The above coating solution is spun onto a borosilicate glass plate having dimensions of 10×10 cm. The liquid layer is cured in a UV reactor which is provided with a low-pressure mercury vapour discharge lamp. The intensity is 2 mW/cm². The substrate temperature is 250° C. Curing takes 5 minutes. The magnesium-oxide layer formed has a thickness of 200 nm, and the tape test showed that it adheres well to the glass surface.

A Faraday cup is used to measure the secondary electron emission of the magnesium-oxide layer formed. The δ value is 7.5 and is comparable to that of vapour-deposited or sputtered magnesium-oxide layers.

The coating solution and the method in accordance with the invention enable a satisfactorily adhering magnesium-oxide layer having a high secondary electron emission coefficient δ to be manufactured on a glass substrate at a temperature below 250° C. The coating solution and the method are particularly suitable for the manufacture of magnesium-oxide layers on the glass selection plates and the duct plate of a thin electron display and the coating solution can particularly suitably be used as electrode material in plasma displays.

I claim:

1. A coating solution which can suitably be used to manufacture a magnesium-oxide layer on a glass substrate by curing, said coating solution comprising a solvent as well as a magnesium compound, characterized in that the magnesium compound is obtainable by, in succession, partially acetylating and partially hydrolysing a magnesium-dialkoxide compound of the formula $Mg(OR)_2$, thereby forming the magnesium compound of the formula $Mg(OH)_x(OR)_y(OAc)_z$, wherein R is a $C_1$-$C_5$ alkyl group, and OAc is an acetyl or acetylacetonate group, and wherein $0<x<1$ $0<y<1$ $0<z<1$, and $x+y+z=2$.

2. A coating solution as claimed in claim 1, characterized in that the solvent comprises an alcohol.

3. A coating solution as claimed in claim 1, characterized in that it contains no free water and comprises 0.01 to 0.2 mol/l nitric acid.

4. A coating solution as claimed in claim 1, characterized in that magnesium-oxide particles having dimensions of 50–100 nm are suspended in the solution.

5. A method of preparing a coating solution as claimed in claim 1, characterized in that a magnesium-dialkoxide compound is dissolved in water-free acetic acid or acetylacetonate and, subsequently, water is added to the solution obtained, whereafter the acetic acid or acetylacetone and said water are evaporated, thereby forming the compound $Mg(OH)_x(OR)_y(OAc)_z$, after which this compound is dissolved in a solvent.

6. A method of preparing a coating solution as claimed in claim 1, characterized in that a magnesium-dialkoxide compound is suspended in an alcohol, whereafter the magnesium compound is dissolved and modified by adding an excess of water-free acetic acid or acetylacetone, after which the modified magnesium-dialkoxide compound is hydrolysed by adding water, thereby forming the compound $Mg(OH)_x(OR)_y(OAc)_z$.

7. A method of manufacturing a magnesium-oxide layer on a glass substrate, which method comprises the following steps:

applying a layer of a coating solution as claimed in claim 1 to the substrate;

exposing the layer to UV light having a wavelength which is shorter than 300 nm in an inert atmosphere and simultaneously heating the layer, thereby forming the magnesium-oxide layer.

8. A method as claimed in claim 7, characterized in that heating takes place at a temperature of maximally 250° C.

9. A method as claimed in claim 7, characterized in that the exposure to UV light is carried out by means of a high-pressure mercury vapour lamp.

* * * * *